United States Patent
Bird et al.

(10) Patent No.: US 9,015,776 B2
(45) Date of Patent: *Apr. 21, 2015

(54) ENTERTAINMENT SYSTEMS UTILIZING FIELD REPLACEABLE STORAGE UNITS

(71) Applicant: Systems and Software Enterprises, LLC, Brea, CA (US)

(72) Inventors: Randall Bird, Newport Beach, CA (US); Kevin Cote, Yorba Linda, CA (US); Rodney Farley, Yorba Linda, CA (US); Joseph Renton, Orange, CA (US)

(73) Assignee: Systems and Software Enterprises, LLC, Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,430

(22) Filed: Oct. 29, 2013

(65) Prior Publication Data

US 2014/0059184 A1    Feb. 27, 2014

Related U.S. Application Data

(63) Continuation of application No. 12/629,695, filed on Dec. 2, 2009, now Pat. No. 8,667,544.

(60) Provisional application No. 61/119,132, filed on Dec. 2, 2008.

(51) Int. Cl.
| H04N 7/18 | (2006.01) |
| H04L 29/06 | (2006.01) |
| H04H 20/62 | (2008.01) |
| G06F 13/40 | (2006.01) |

(Continued)

(52) U.S. Cl.
CPC ............... *H04L 65/60* (2013.01); *H04H 20/62* (2013.01); *G06F 13/4081* (2013.01); *B60R 2011/0003* (2013.01); *B60R 2011/0078* (2013.01); *B60R 2011/0096* (2013.01); *B60R 2011/0294* (2013.01)

(58) Field of Classification Search
USPC .................................. 725/75, 77, 76, 80, 82
See application file for complete search history.

(56) References Cited

U.S. PATENT DOCUMENTS

| 5,289,272 A | 2/1994 | Rabowsky et al. |
| 5,404,567 A | 4/1995 | DePietro et al. |

(Continued)

FOREIGN PATENT DOCUMENTS

| GB | 2466444 | 6/2010 |
| GB | 2466445 | 6/2010 |

(Continued)

*Primary Examiner* — Nnenna Ekpo
(74) *Attorney, Agent, or Firm* — Fish & Tsang LLP

(57) ABSTRACT

Vehicular entertainment systems where devices in the systems can each utilize a common type of storage units are presented. A vehicular entertainment system can include a media server head unit in communication over a network with a plurality of media players that are installed about the cabin of a vehicle. Media content can be stored on a plurality of field replaceable storage units where each of the storage units can be installed in any one of the players or the server. Each of the storage units can store a substantially identical content set including passenger content, player content, server content, crew content, or other types of content. The server or players can be restricted from accessing content to which they lack rights, possibly based on a location identifier that indicates roles or responsibilities of the players at their installed location.

19 Claims, 5 Drawing Sheets

(51) Int. Cl.
  *B60R 11/00*   (2006.01)
  *B60R 11/02*   (2006.01)

(56) References Cited

U.S. PATENT DOCUMENTS

| | | |
|---|---|---|
| 5,555,466 A | 9/1996 | Scribner et al. |
| 5,990,928 A | 11/1999 | Sklar et al. |
| 6,507,952 B1 | 1/2003 | Miller et al. |
| 6,598,227 B1 | 7/2003 | Berry et al. |
| 6,810,527 B1 | 10/2004 | Conrad et al. |
| 7,086,081 B2 | 8/2006 | Martinez et al. |
| 7,100,187 B2 | 8/2006 | Pierzga et al. |
| 7,124,426 B1 | 10/2006 | Tsuria et al. |
| 7,945,934 B2 | 5/2011 | Margis et al. |
| 8,092,292 B1 | 1/2012 | White |
| 8,122,466 B2 | 2/2012 | Rothschild |
| 2004/0033821 A1 | 2/2004 | Slesak et al. |
| 2004/0128688 A1 | 7/2004 | Seo |
| 2005/0114894 A1 | 5/2005 | Hoerl |
| 2005/0132407 A1 | 6/2005 | Boyer, Jr. et al. |
| 2005/0240691 A1 | 10/2005 | Yurusov |
| 2006/0031748 A1 | 2/2006 | Brady, Jr. et al. |
| 2006/0052935 A1 | 3/2006 | Nakayama et al. |
| 2006/0075934 A1 | 4/2006 | Ram |
| 2006/0107295 A1 | 5/2006 | Margis et al. |
| 2006/0174285 A1 | 8/2006 | Brady, Jr. et al. |
| 2006/0181965 A1 | 8/2006 | Collart |
| 2007/0038434 A1 | 2/2007 | Cvetko |
| 2008/0089658 A1 | 4/2008 | Grady et al. |
| 2008/0124054 A1 | 5/2008 | Bonar |
| 2008/0127278 A1 | 5/2008 | Bonar |
| 2008/0228330 A1 | 9/2008 | Srinivasan et al. |
| 2009/0013357 A1 | 1/2009 | Cassellia et al. |
| 2009/0075639 A1 | 3/2009 | Bloebaum et al. |
| 2009/0138516 A1 | 5/2009 | Young et al. |
| 2010/0120450 A1 | 5/2010 | Herz |
| 2010/0162325 A1 | 6/2010 | Bonar |
| 2010/0162326 A1 | 6/2010 | Bonar |
| 2010/0162327 A1 | 6/2010 | Bonar |

FOREIGN PATENT DOCUMENTS

| | | |
|---|---|---|
| GB | 2468107 | 8/2010 |
| WO | 2004/008277 | 1/2004 |
| WO | 2005/000437 | 1/2005 |

ENTERTAINMENT SYSTEMS UTILIZING FIELD REPLACEABLE STORAGE UNITS

This application is a continuation of U.S. patent application Ser. No. 12/629,695, filed Dec. 2, 2009, which claims the benefit of priority to U.S. Provisional Application No. 61/119,132 filed on Dec. 2, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is entertainment system technologies.

BACKGROUND

In-Flight Entertainment (IFE) systems can be quite complex and require a great deal of infrastructure to provide updated content to passengers on an aircraft. Typically, once a month a media server of an IFE has its content updated by downloading media content to the server for distribution to passengers upon request. The server can then provide media content over a network to passengers via seat back media players.

Quite a bit of effort has been put forth toward providing media content to IFEs. For example, U.S. Pat. No. 5,404,567 to DePietro et al. titled "Method of Distributing Audio Programming to Passenger Entertainment Systems, and Apparatus", filed Jul. 16, 1993, describes a distribution system having a central hub which distributes media content to local distribution facilities near or at airports. The local distribution facilities then download data to aircraft media servers. Such approaches are useful for distributing media content aircraft. However, such approaches fail to address numerous issues associated with updating and distributing media content among IFE elements (e.g., media players, servers, etc.) in a cabin of a vehicle. For example, should a network connection break between players and a content server, a passenger would lose access to their media content.

U.S. patent application 2006/0031748 to Brady et al. titled "System and Method for Loading Content in an In-Flight Entertainment System", filed May 27, 2005, describes an IFE where a portable data load can be used to provide media content to an aircraft content server. Although Brady provides a better approach for delivering content to elements of an IFE, Brady fails to address issues relating to maintaining access to content should a media network or element fail within the IFE system.

Other examples of approaches for distributing content throughout an IFE ecosystem include:
U.S. patent application publication 2006/0107295 to Margis et al. titled "Portable Media Device and Method for Presenting Viewing Content During Travel" filed on Jun. 15, 2005, discusses the use of portable media devices within passenger entertainment systems.
International patent application publication WO 2004/008277 to Rogerson titled "Modular Entertainment System Configured for Multiple Broadband Content Delivery Incorporating a Distributed Server" filed Jul. 11, 2003, describes an IFE system where each node in the system can distribute content among other nodes without requiring a centralized distribution network.

These and other known art provide for updating content in an IFE by downloading content to a server and then distributing the updated content among the devices in the system. Interestingly, the various elements in the known systems use different modalities for storing content on the different devices. For example, a head unit media server might use a hard drive, RAID array, or DVD while the media players might lack a content storage medium or might utilize a different medium than the server. It has yet to be appreciated that allowing nearly all, if not all, elements in an IFE system to use the same modality for storing content could solve many issues. Using a common type of storage unit, or storage units have the same form factor, that stores a complete set of media content allows for quickly updating content within an IFE and renders the IFE system robust against many points of failure at a fine level of granularity. If any one device or network connection fails, all other devices still have access to the complete content set through their installed storage unit. Furthermore, spare media players can be easily updated at the same time a head unit media server is updated by replacing one or more the spare's storage unit in the field. In environment where each set of storage unit stores the same content set, unskilled individuals can easily update content by installing any individual storage unit into any receiving device.

Thus, there is still a need for vehicular entertainment systems where the elements of the system can access content from a common content storage unit.

SUMMARY OF THE INVENTION

The inventive subject matter provides apparatus, systems and methods in which a vehicular entertainment system utilizes a common storage unit form factor for the various devices in the ecosystem. One aspect of the inventive subject matter includes an entertainment system where multiple removable storage units, preferably field replaceable storage units (FRSUs), can store digital media content. The FRSUs can be arranged into sets of one, two, three, or more FRSUs per set, where each FRSU set can store a media content set for the entertainment system. A set of FRSUs can be installed into a media server, individual media players, spare units, or other devices in the entertainment system. The entertainment system can also include a head unit operating as a media server where the media server includes one, two, or more receptacles for the FRSUs configured to receive a first set of FRSUs. The media players can also comprise one, two, or more receptacles for receiving a second set of FRSUs storing a similar, if not the same, set of digital media content as the first set of FRSUs. Media servers or players are configured to access the media content set stored on their installed sets of FRSUs as desired or as permitted. It some embodiments, the media players are configured to only access authorized content, possibly based on location information relating to where the media player is installed. For example, if a media player is installed within a crew cabin or other non-passenger area, the media player could be restricted to access only non-passenger related content as opposed to being permitted to access passenger content. The media players can also be allowed to access the media server over the network to obtain the media content.

Another aspect of the inventive subject matter can include methods of distributing at least a portion of a set of updated content within a vehicular entertainment system. Contemplated methods can include a step of providing multiple, physically similar FRSUs, again in sets of FRSUs. Each set of the FRSUs stores can store a similar media content set. Access can be provided to a head unit of the entertainment system operating as a media server, where the media server comprises one or more receptacle into which a first set of FRSUs can be inserted or otherwise installed. The method can include providing access to installed media players, each media player also having one or more receptacles for a second set of FRSUs. The media content of the entertainment system can be updated by replacing at least one FRSU from the first set of FRSUs of the media server with an FRSU having at least portions of the set of updated media content, and further replacing the media content of the installed media players with at least some of the set of updated content. In some embodiments, the media content of the installed media players can be updated by the media server sending some of the updated content over a network to the media players. The media players can replace the old media content with the updated content on their installed FRSUs. It is also contemplated that media players, installed media players or spares, could have their installed FRSUs physically replaced with other FRSUs from another, third set of FRSUs storing some of the updated content. Media players can also determine which portions of the updated content are available for access based on an installed location of the media players, possibly based on a docking station ID, location ID, or other information.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion references will be made to servers, services, interfaces, portals, platforms, or other systems formed from computing devices. It should be appreciated that the use of such terms is deemed to represent one or more computing devices having at least one processor configured to execute software instructions stored on a computer readable media. For example, a server can include one or more computers operating as a web server, database server, or other type of computer server in a manner to fulfill described roles, responsibilities, or functions. One should also appreciate that the inventive subject matter addresses several technical effects. For example, a vehicular entertainment system's content can be quickly updated, or distributed around the system. Additionally, the entertainment system will be robust against many points of failure because each device has access to a complete set of media content. Should any network connection or device fail, the remaining devices still retain the capacity for presenting the media content.

Although the inventive subject is presented within the context of an in-flight entertainment (IFE) system, the disclosed techniques can be easily adapted to other forms of entertainment systems. It is contemplated that a vehicular entertainment system could be deployed in trains, buses, automobiles, ships, or other types of vehicle. It is further contemplated that the disclosed techniques could be adapted for use in non-vehicular entertainment system. Example non-vehicular environments include the home, a museum, a bar, a lounge, a salon, or other non-vehicular environments.

One should appreciate that a set of FRSUs can comprise one, two, three, or more FRSUs where the set can store a digital media content set. Two sets of FRSUs could comprise different numbers of individual units while storing the similar if not the same digital media content set. For example, a head unit could utilize a first set of three FRSUs storing the set of media content, while a media player might utilize a second set of two FRSUs storing the same set of media content. Although a set of FRSUs is contemplated to include any number of FRSUs, a commercially viable number is considered to be less than four. The following discussion presents the concept within the scope where a set of FRSUs includes a single FRSU for ease of discussion and should not be interpreted to be limiting the number of FRSUs in a set.

Figure 1:
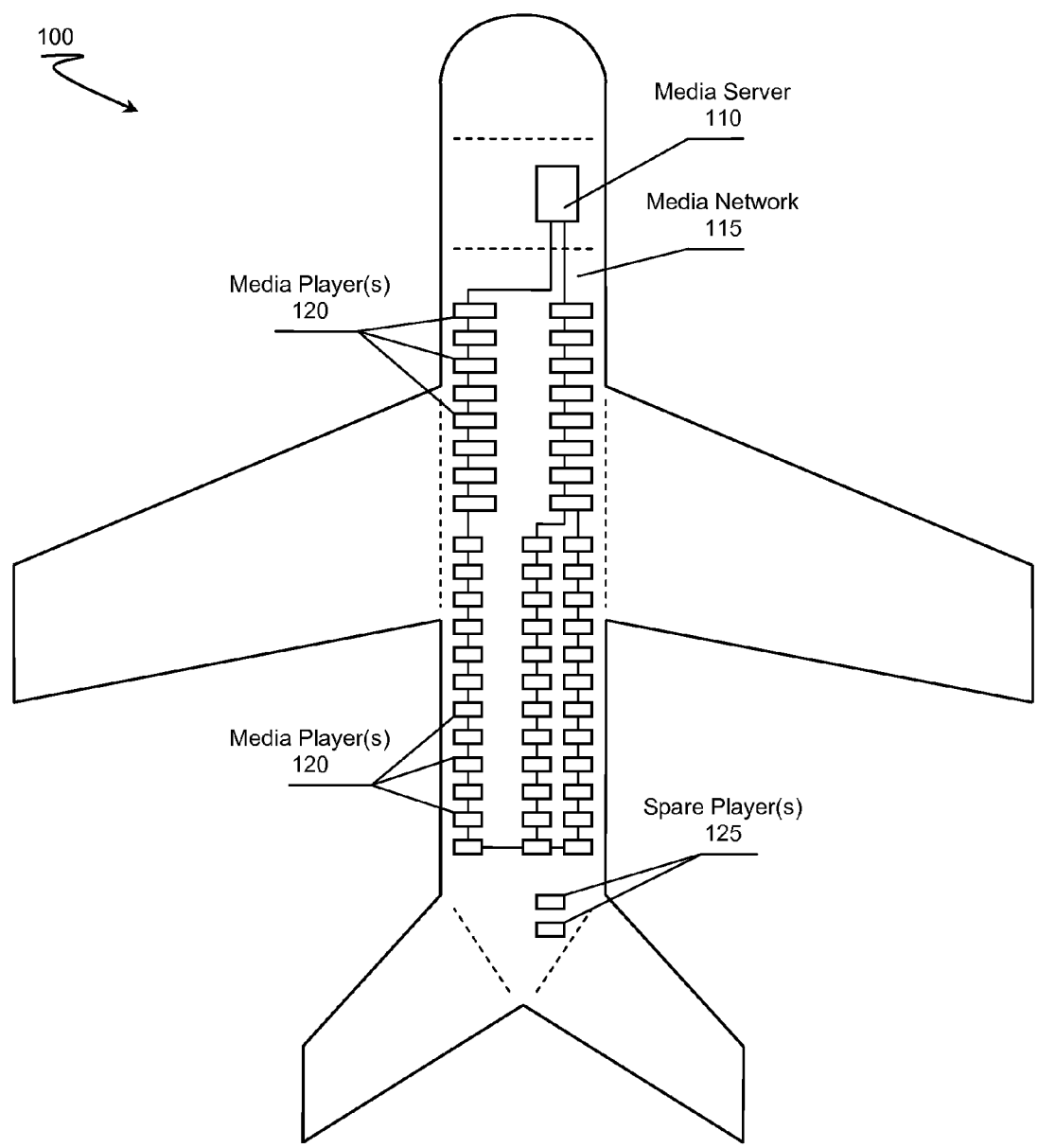
FIG. 1 is a schematic of a vehicular entertainment system deployed in an aircraft.

In FIG. 1, entertainment system 100 represents a vehicular entertainment system, possibly an IFE for an aircraft as shown. Entertainment system 100 can include a media server 110 in communication with a plurality of media players 120 over a media network 115. It is also contemplated that system 100 could include one or more spare media players 125.

Media server 110 represents one or more head units for entertainment system 100 configured to provide media content to media players 120. Media server 110 can include one, two, or more storage unit receptacles for receiving a set of storage unit storing media content available for access within system 100. The receptacle can include a slot, a bay, a connector, or other type of receiving space for a storage unit. In more preferred embodiments, the receptacle is within a housing of media server 110. The receptacle should have a complementary interface to the interface of a content storage unit. It is contemplated that the receptacle could comprise a wired interface (e.g., USB, firmware, ATA, PCI, etc.), or a wireless interface (e.g., Bluetooth, 802.11, Zigbee, wireless USB, etc.), although a wired, standards-based interface is more preferred over a wireless interface.

Media server 110 can also be configured to control or otherwise manage the operation of system 100 over network 115. Contemplated management functions include providing content to players 120, receiving content (e.g., media content, passenger surveys, usage statistics, etc.) from players 120, reporting player status (e.g., on, off, failed, etc.), or other control related functions. Media server 110 can also manage other aspects of network 115 including distributing data among the various elements, operating as an intermediary between elements external to the vehicle (e.g., a terminal data loader, passenger databases, etc.), uploading collected statistics to remote databases, or other types of management functions.

Network 115 can provide a communication network among the various elements of system 100. In some embodiments, network 115 includes one or more wired links allowing media server 110 to communicatively couple to each of active media players 120. For example, network 115 could comprise a wired Ethernet network. Furthermore, media players 120 can also communicatively couple to each other as shown. It is also contemplated that network 115 could also comprise wireless communication links among the devices (e.g., 802.11, wireless USB, etc.).

Network 115 can also include a looped daisy chain network of docking stations, where media server 110 connects to docking stations for media players 120. The docking stations can operate as a switch to allow media players 120 to access network 115. Such an approach is described more fully in co-pending U.S. patent application to Bird et al. titled "Entertainment System with Looped Daisy-Chained Network of Docking Stations" having Ser. No. 12/610,908 filed on Nov. 2, 2009.

Media players 120 comprise a computing device configured to access and play media content from a storage unit installed in media player 120. Example media players 120 can include a music player, a video player, a game console, or other similar devices. In some embodiments, media players 120 comprise multiple functionalities to play various forms of media content including audio data, video data, game data, or other forms of application data. It is also contemplated that media players 120 can serve as an input device for a passenger. As a passenger interacts with a media player 120, it can store passenger data or possibly upload the passenger data to media server 110 over network 115. For example, a passenger's purchases or usage statistics can be sent to media server 110 for processing.

In more preferred embodiments, media players 120 are considered field replaceable devices that can be installed or uninstalled by a suitably authorized crew member of the vehicle. It is also contemplated that media players 120 can be embedded into docking stations at various locations about the cabin of a vehicle. If one of media players 120 requires attention, a crew member could unlock the player 120 from its docking station and replaced it with a spare player 125. Co-pending U.S. patent application to Bird et al. titled "Universal Docking System" having Ser. No. 12/467,959 filed on May 18, 2009, discusses various aspects of suitable docking stations that could be adapted for use with the disclosed subject matter.

The number of media players 120 in system 100 can vary substantially. For small vehicles, there might be 10 or 20 players. For larger vehicles, an aircraft for example, system 100 could include 100, 200, 300, or more media players 120. It is also contemplated for even larger vehicles, a passenger ship for example; there might be over 1000 media players 120 in system 100. In this instance, and where other upper limits are not expressly stated, the reader should infer a reasonable upper limit.

Media players 120 can be installed about the cabin of the vehicle in different locations. It is contemplated that media players 120 can be installed in seatbacks, arm rests, bulkheads, walls, ceilings, or other locations. In especially preferred embodiments, media players 120 or spare players 125 are fungible with respect to each in a manner that any one of media players 120 or spare players 125 could be switched with any other one of players 120. Such an approach is advantageous should one of players 120 fail. An unused player 120 or spare player 125 could be installed as a working field replaceable unit for the failed unit.

Spare players 125 could be active or passive spares. An active spare is considered to be a spare player 125 that is installed in a docking station or cradle where the active spare can communicate with other players 120 or media server 110. A passive spare is considered to be a spare player 125 that is disconnected from network 115, waiting to be installed.

Media players 120 and spare players 125 preferably have one, two, or more storage unit receptacles configured to receive any one of a plurality of storage unit storing media content in system 100. In some embodiments, the storage units can be delivered as a set of units that collectively store a desirable media content set. As with media server 110, the receptacles of players 120 also have a complementary interface to that of the storage units. Each of the players 120 or 125 could even receive a storage unit installed in media server 110. Preferred storage units are field replaceable storage units (FRSUs) and are also fungible from the perspective of their installed locations and possibly with respect the content they can access and present.

One should appreciate that a field replaceable storage unit is considered to be replaceable while a vehicle is moving or can be replaced by unskilled, authorized person. For example, while an aircraft is stationary at a terminal, an aircraft terminal worker could pull a first FRSU or a first set of FRSUs from a player 120 and install a second FRSU or second set of FRSUs into the player 120, or server 110. Another example includes a crew member during a flight uninstalling an FRSU and installing a different FRSU into a player 120 or media server 110. Such unskilled individuals can be authorized in the sense they have a key to unlock an FRSU's receptacle.

Figure 2:
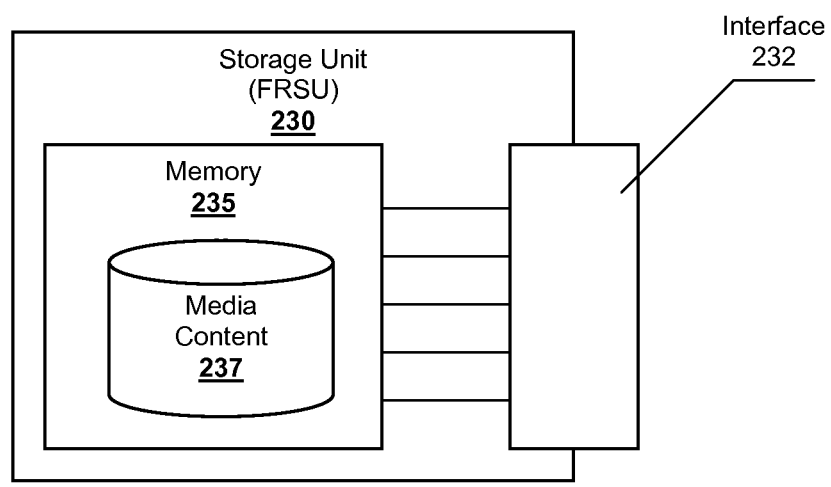
FIG. 2 is a schematic of a possible content storage unit that is field replaceable.

In FIG. 2, storage unit 230 represents an FRSU having a computer readable memory 235 storing media content 237. Storage unit 230 can also include interface 232, through which it can communicate with a receiving device (e.g., players 120, spare players 125, media server 110, etc.). Storage units 230 can comprise rotating or non-rotating memory 235. Example rotating memory 235 includes hard disk drive platters, DVDs, Blu-Ray discs, CDs, or other rotating media. In more preferred embodiments, memory 235 is non-rotating and can include flash, NVRAM, or other forms of persistent memories. A suitable storage unit 230 includes a secure digital card (SD Card) similar to those produced by SanDisk™, Toshiba™, Kingston™, or others based on one or more SD technologies (e.g., SD, SDHC, SDXC, etc.) in one or more form factors, SD, min-SD, micro-SD, etc. for example. Memory 235 can comprises a capacity of up to 4 GB, 8 GB, 16 GB, 32 GB, 64 GB, 128 GB, 512 GB, or even up to 2TB (e.g., SDXC cards). SD cards, or other small flash memory cards, provide a compact, convenient, robust form factor over bulkier technologies.

Storage unit 230 can also have other advantageous properties. One contemplated property includes an ability to be hot swapped. For example, a media player or server could be accessing media content 237 in storage unit 230 when an individual replaces unit 230. Such an approach eases an amount of effort or reduces a number of steps required to replace storage unit 230 in the field. Storage units 230 are preferably physically similar to each other to the extent they mutually adhere to a common standard, possibly those standards developed by the SD Card Associated (SDA; http://www.sdcard.org/home/). More preferably, storage units 230 used within entertainment system utilize the same interface 232 so each of the storage units 230 can inserted in the receptacles of the various devices and can be accessed by the devices. Two of storage units 230 are considered to be physically similar if a first storage unit 230 has substantially the same form factor as a second storage unit 230. Additionally physically similar storage units 230 can be installed into the same receiving receptacle and both can provide the receiving device access to media content 237. One should note that two storage units 230 could have different capacities while still being physically similar, 4 GB versus 8 GB for example.

Although a single storage unit 230 as storing media content 237, it should be appreciated that media content 237 can include a set of digital media content spread across multiple storage units 230. Content 237 can be spread using any suitable techniques including at the file level, directory level, volume lever, or even as a RAID-like structure (e.g., mirroring, striping, parity, etc.). For example, one member of a set of FRSUs could store media server related content while a second member of the set of FRSUs could store passenger related content. Additionally, a first set of FRSUs 230 might have content 237 striped over two 8 GB SD cards targeting media players while a second set of FRSUs 230 might have content 237 striped over three 4 GB SD cards intended for a media server. It should also be appreciated that a single FRSU storing all of content 237 represents a degenerate case for the myriad of possible configurations of a set of FRSUs storing a set of digital media content.

Figure 3:
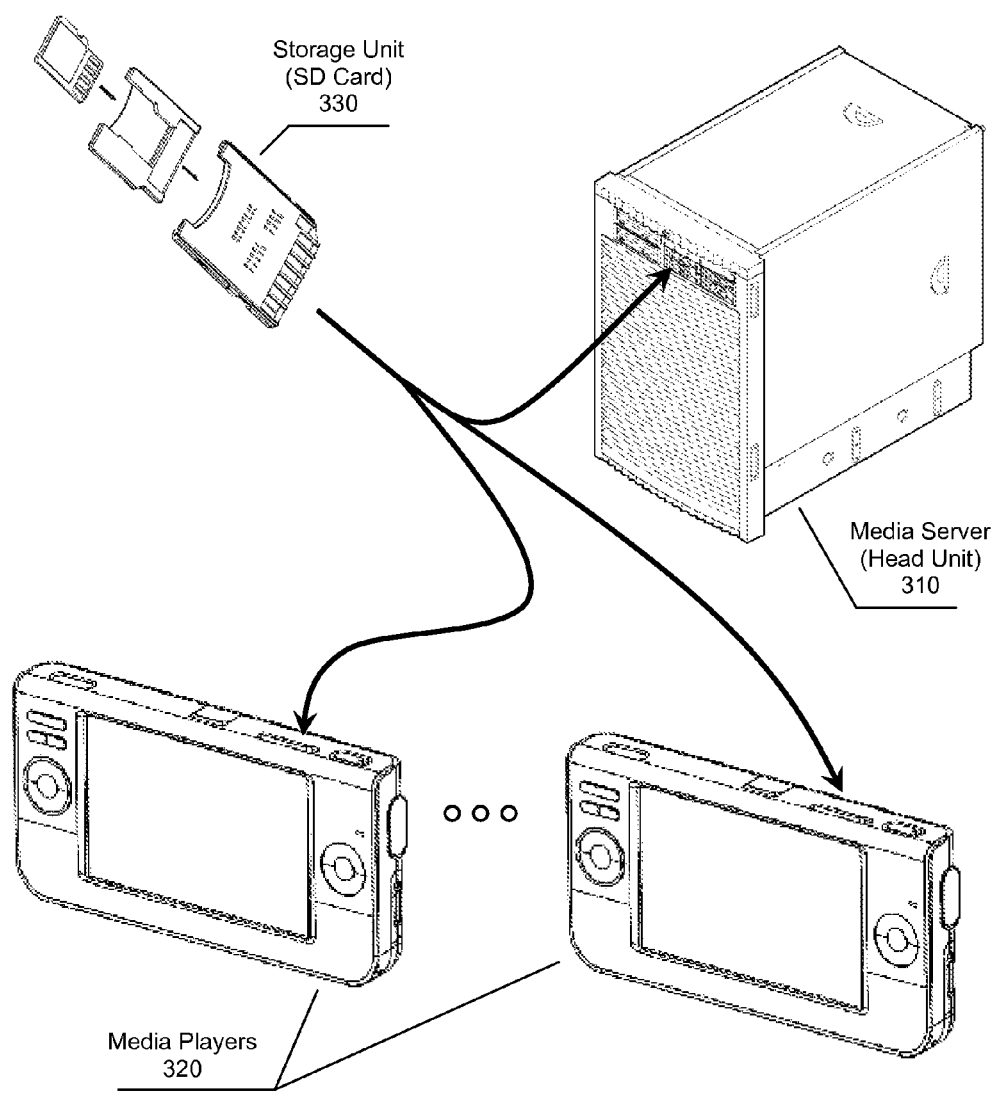
FIG. 3 illustrates a possible storage unit that can be installed within a media server or a media player.

In FIG. 3, entertainment system 300 represents an environment where media server 310 and players 320 receive one or more of a common storage unit 330 in the form of an SD card, possibly in the form of a set of FRSUs. In more preferred embodiments, a single storage unit 330 can be an FRSU that can be installed within media server 310, any one of players 320, or other devices including spare players. It should be appreciated that each of the storage units 330 in system 300 can be installed into any one of suitably configured devices. In this sense, each of a plurality of storage units 330 is fungible with respect to a receiving device subject to differences of a format in which media data is stored.

Storage unit 330 can include a complete set of media content directed to each of the various devices. For example, storage unit 330 can include media server content, passenger content, crew content, applications content, firmware updates, or other types of content. The devices in system 300 can determine to which content they have access rights. Storage unit 330 is illustrated to euphemistically represent a set of FRSUs.

Storage unit 330 is illustrated as a modular device. One should appreciate that storage unit 330 could comprise one or more adapters that allows it to interface with a receptacle.

Figure 4:
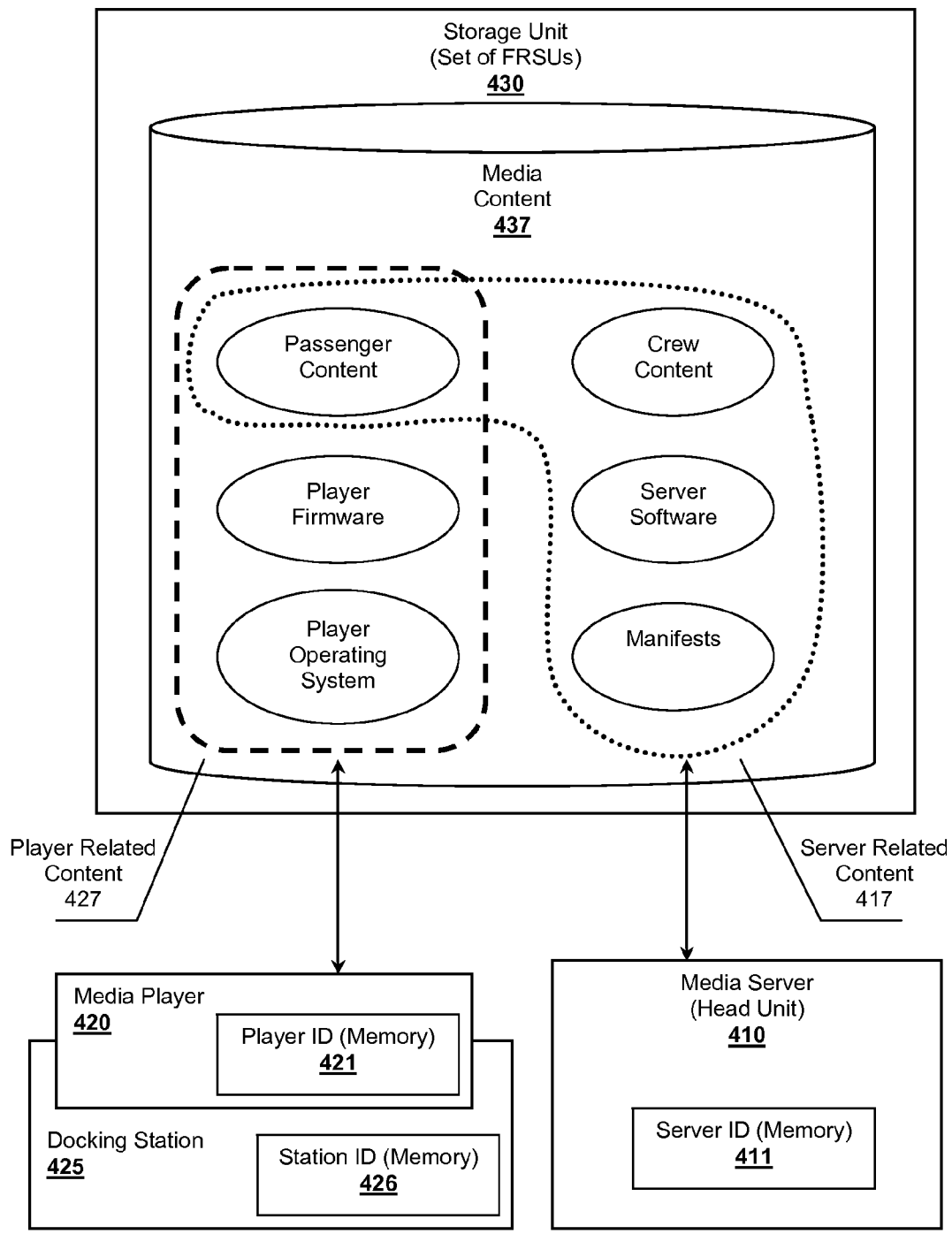
FIG. 4 is a schematic showing how a media server or a media player can access permitted content.

Considered FIG. 4 where storage unit 430 can be installed into media player 420 or media server 410. Again, storage unit 430 is shown euphemistically to represent a set of FRSUs that can store a set of media content. Storage unit 430 stores media content 437, which can store many different types of content. In the example shown, some of the content is considered player-related content 427, possibly comprising content targeting a passenger or a firmware update for player 420. Other content can be considered server-related content 417, which might or might not overlap with player-related content 427. Server-related content 417 might include server application software, crew content, public announcements, or other content meant for server 410.

Each of storage unit 430 within the contemplated entertainment systems can store similar media content 437 targeting a spectrum of devices within the system. If storage unit 430 is installed within media player 420, then media player 420 has access to player-related content 427. If storage unit 430 is installed within media server 410, media server 410 has access to server-related content 417. Although server-related content 417 is illustrated as being different from player-related content 427, is it also contemplated that server 410 could have access rights to all of media content 437. As discussed previously is it contemplated that media content 437 could be partitioned among a set of FRSUs, possibly according to target receiving device.

Each device can be restricted from accessing all the content or can be permitted to access only content targeting the receiving device. In some embodiments, the devices can include an identifier that can be used to unlock requested content. For example, player ID 421 can represent a key or other token that can used to access player-related content 427, which could be decrypted based on the key. Similarly server-related content 417 could be decrypted or otherwise access based on server ID 411.

In some embodiments access rights can include different types of right, possibly organized in levels or hierarchically. A device could have only rights to read content, but might also be restricted from writing content or playing content. For example, media player 420 could have granted rights to read server-related content 417 and send the content to media server 410, while media player 420 would also be restricted from presenting such content to a passenger. Contemplated access rights can include read rights, write rights, rights to exchange content, rights to accept connect, rights to copy content, rights to play content, rights to execute content, or other types of rights.

Accessing content can include the use of secret keys as discussed above or other means. It is also contemplated that storage unit 430 could comprise processor configured to execute software instructions that provide for an authorization handshake between storage unit 430 and the receiving device. Such approaches provide for supporting digital rights management where content could be licensed only to authorized players. Furthermore, media content 437 could be protected by requiring that storage unit 430 adheres to one or more standards for securing the memory 435 of storage unit 430. For example, the storage device could be made to adhere to Federal Information Processing Standard (FIPS) 140 or its variants. Such approaches mitigate a risk of media content 437 being accessed by unlicensed or unauthorized devices or individuals.

It is also contemplated that content could be accessed, or restricted, based on an installed location of player 420. In embodiments where player 420 is installed within docking station 425, docking station 425 can store a station ID 426. Station ID 426 can encode information relating to where docking station 425 is located. For example, docking station 425 can be placed in a seatback (e.g., row or seat number), a bulkhead, a crew compartment, or other location. Media player 420 can use station ID 426 to access the appropriate content for the location.

Contemplated IDs can take on different forms to meet the requirements of a target application. An ID can comprise a GUID, UUID, a hash value, a string of characters, or other data types. IDs can include information representing a secret key for deciphering content, a file or directory handle in a file system, a password, an identifier for a member of an FRSU set, or other secure information that can be used to restrict or permit access to content. For example, in embodiments where docking station ID 426 comprises a directory name, media player 420 can use a file system to open the corresponding directory on a member of an FRSU set having content 417 for media player 420. One can consider the ID has having role or responsibly information encoded within the ID. Player 420 can fulfill the roles or responsibilities by using the ID to unlock the corresponding content 437 (e.g., entertainment data, applications, etc.)

Figure 5:
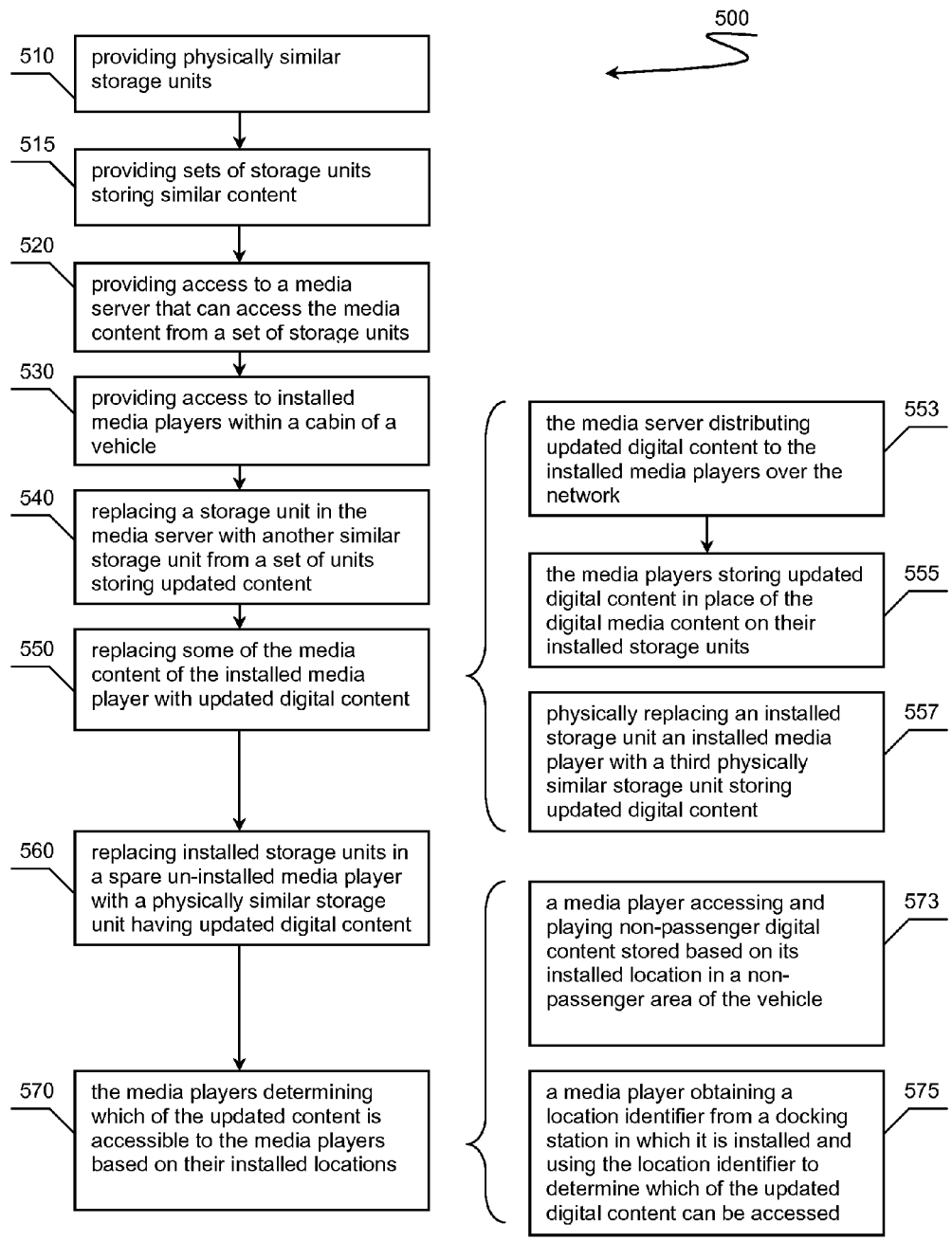
FIG. 5 is an outline of a method for updating content in a vehicular entertainment system.

FIG. 5 provides an outline of method 500 for distributing updated entertainment content within a vehicular entertainment system. Step 510 can include providing physically similar storage units, preferably FRSUs, where each storage units can store at least portions of a digital media content set for the system. The content from one set of FRSUs to another set is preferably similar. Two content sets are considered similar if they have overlapping content that can be used by different devices within an IFE. Two content sets would be considered substantially identical if there is less than a 20% difference in content size for overlapping content when uncompressed, and more preferably less than a 10% difference.

It is contemplated that the content set could deviate for trivial reasons and is considered to fall within the scope of the inventive subject matter. For example, if a set of FRSUs store extraneous data that would likely be ignored, then such irrelevant, extraneous data would be considered trivial.

Step 515 contemplates providing sets of FRSUs where each set can store similar digital media content set. A first set of FRSUs can be used for a media server while multiple second sets of FRSUs can target media players. In some embodiments, the first and second sets have the same content and the same number of FRSUs. In other embodiments, the first and the second sets could have different numbers of FRSUs while still storing similar content. As discussed previously a set of FRSUs can include one, two, three, or more FRSUs.

Step 520 can include providing access to a media server preferably operating as a head-unit for the vehicular entertainment system. The media server can be configured to access the set of digital media content from a first set of storage units installed in suitably configured receptacles. The media server can be further configured to access only content to which is has rights, if necessary, possibly based on a server ID.

At step 530, access can be provided to a plurality of media players installed within a cabin of the vehicle. The media players can be in communication with one or more media servers over a media network. Additionally, each of the media players can also comprise one, two, or more receptacles capable of receiving any one FRSUs of the plurality second sets of storage units. The media players can also be configured to access digital media content on the second set of storage units, subject to authorization or restrictions, for presentation on the player.

A set of digital media content on the installed storage units can be updated in many different fashions. For example, step 540 can include physically replacing a storage unit or up to a complete set of storage units in a media server with other physically similar storage units having updated digital content. The updated digital content can replace the digital media content on the storage units of the media players at step 550.

One possible method of replacing the digital media content on the media player's installed storage units can include step 553 where the media server distributes at least some of the updated digital content over a network to the installed media players. The media server can distribute portions of the update content over a network by sending the updated digital content as a stream to one or more media players individually, by multi-casting the content, by broadcasting the content, or even by updating a first media player, which then updates other media players. Any suitable protocol can be used to distribute the content including UDP, TCP, FTP, TFTP, HTTP, SSL, SSH, or other data exchange or security protocols. It is also contemplated that a media player could miss portions of the updated digital content, possibly due to a dropped packet. The media players can be configured to request dropped portions from the media server or other media players as desired. The media players can then store updated content within the memories of their installed storage units, possibly replacing the original digital media content as called out in step 555.

Yet another possible approach for replacing the digital media content on a media player's installed set of storage units can include, at step 557, physically replacing an installed storage unit of the installed media player with another physically similar storage unit having at least some of the updated digital content. For example, while the aircraft is in flight an aircraft crew member could remove one or more storage units from a passenger's seatback media player, and then install updated second storage units having the updated content.

It is also contemplated at step 560 that digital media content can be updated by replacing installed storage units in at least one spare un-installed media player with physically similar storage units storing updated digital content. Providing spare media players allows crew members, or other unskilled individuals, to replace problematic installed media players. The spare media players could be active spares that are part of a media network or passive spares that are not part of the media network. The media players can also be configured to be hot-swappable so that a media player can be removed from its installed position, possibly within a docking station, while the media player is actively connected to the media network. Such an approach allows crew members to quickly replace failed or failing media players, which reduce inconvenience to a passenger. One should also note such a system is robust against failure at a fine level of granularity. Should a storage unit fail; the storage unit can be replaced. Should a player fail; the player can be replaced. Should a media server fail; content can be obtained from other players.

Once a media player has update digital content, at step 570, the media player can determine which portions of the updated digital content is accessible to the media player. In some embodiments, the media player can use a player ID, docking station ID, or other form of token to determine which content should be accessed. It is specifically contemplated that a media player's access rights can be determined by an installed location of the media player, possibly through a location identifier (e.g., docking station ID, GUID, etc.) as suggested by step 575. As discussed previously an identifier could be used as a key or token to gain access to content, where the key could represent a decryption key. The identifier could also represent a password to access a directory of content, or could represent a directory identifier in a file system where the directory holds a device's content.

As an example, consider a media player installed in crew compartment bulkhead. The media player could use a bulkhead docking station's ID as an indicator that the media player is installed in a crew area or other non-passenger location. The media player might only be able to access or play non-passenger content of the updated digital content stored on its installed set of storage units based on being installed in a crew area of the vehicle (step 573). Such a media player might then only have sufficient privileges to access crew related content (e.g., seating manifests, control panel applications, etc.). Whereas the same media player installed within a seatback docking station might only have sufficient privileges to access passenger content from an installed set of storage units (e.g., movies, games, catalogs, etc.), and would restrict access to other content (e.g., crew content, media server content, etc.)

One should note there are many advantages that result from having an entertainment system supporting a common storage unit strategy, where a set of storage units can be installed within different devices of the entertainment system.

One advantage includes a reduction in cost or time to maintain storage units. A single type of storage unit can be used across all devices so that only one type of infrastructure would be required to load content on to storage units or sets of storage units. Additionally, upgrading content in an IFE, or other vehicular entertainment system, can be achieved quickly and easily by simply installing new sets of storage units into a media server or media players. A media player whose storage unit receptacles are not easily accessed can have its set of storage units updated over a media network from another media player, from a media server, from a combination of both, or from other devices.

Another advantage includes increasing the robustness of an entertainment system against many points of failure. Contemplated entertainment systems can be repaired in the field, even during a flight, by replacing one or more failed units. If the failed unit is a storage unit, it can be swapped out with another unit have similar content. If a storage unit is not available, content can be obtained from other media players or a media server over a network. If a media player fails, it can be replaced with a spare player having the similar content, and so on.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An entertainment system for a vehicle, comprising:
   a plurality of physically-similar, field-replaceable storage devices, each of which stores a media content set that is similar to the media content sets stored by others of the field-replaceable storage devices;
   a media server having at least one receptacle for the field-replaceable storage devices, the media server configured to receive a field-replaceable storage device and access the media content set stored on the field-replaceable storage device;
   a plurality of media players installed within a cabin of a vehicle, each of which is configured to receive a storage device of the plurality of physically-similar, field-replaceable storage devices; and
   wherein each of the plurality of media players is configured to access at least some of the content stored on the field-replaceable storage device local to that media player.

2. The system of claim 1, wherein the plurality of media players comprises at least 10 media players installed within the cabin of the vehicle.

3. The system of claim 1, wherein the plurality of media players comprises at least 100 media players installed within the cabin of the vehicle.

4. The system of claim 1, wherein each of the media players is communicatively coupled to a media server.

5. The system of claim 1, further comprising a set of passive, spare media players that are physically similar to the plurality of media players, wherein each media player of the set of passive, spare media players is configured to receive a storage device of the plurality of physically-similar, field-replaceable storage devices.

6. The system of claim 1, further comprising a second plurality of field-replaceable storage devices that are physically-similar to the plurality of storage devices, wherein each of the second plurality of storage devices stores an updated media content set.

7. The system of claim 6, wherein each of the plurality of media players installed within the cabin of the vehicle is configured to (a) allow the storage device of the plurality of storage devices to be removed and (b) receive in its place a storage device of the second plurality of field-replaceable storage devices, and wherein each of the media players is further configured access at least some of the updated content stored on the storage device local to that media player.

8. An entertainment system for a vehicle, comprising:
   a plurality of sets of physically-similar, field-replaceable storage devices, each set collectively storing media content that is similar to the media content stored by other sets of the field-replaceable storage devices;
   a media server having at least one receptacle to receive a set of the field-replaceable storage devices, the media server configured to receive the set of the field-replaceable storage devices and access the media content stored on the set;
   a plurality of media players installed within a cabin of a vehicle, each of which is configured to receive a set of storage devices of the plurality of physically-similar, field-replaceable storage devices; and
   wherein each of the media players is configured to access at least some of the media content stored on the set of field-replaceable storage device received by that media player.

9. The system of claim 8, wherein each set comprises a single storage unit that stores the media content.

10. The system of claim 8, wherein each set comprises at least two field-replaceable storage devices that collectively store the media content.

11. The system of claim 10, wherein the media content is striped across the field-replaceable storage devices of each set.

12. The system of claim 8, further comprising a second plurality of physically-similar, field-replaceable storage devices divided into second sets of the storage devices, where each of the second sets collectively stores updated media content.

13. The system of claim 12, wherein each of the media players is configured to receive one of the second sets of storage devices and access at least some of the updated media content.

14. The system of claim 8, wherein each of the media players is communicatively coupled to the media server.

15. A method of updating media content stored on media players of a vehicular entertainment system, comprising:
   providing access to a plurality of media players configured to be installed within a cabin of a vehicle, wherein each of the media players has an installed set of field-replaceable storage units that collectively store a digital media content set that is similar to a content set stored by others of the media players;
   providing access to a media server having at least one receptacle configured to receive a set of the field-replaceable storage units, and to access the digital media content set from the set of received field-replaceable storage units;
   providing access to a plurality of second sets of field-replaceable storage units, where each of the second sets collectively stores an updated digital media content set that is similar to a content set stored by others of the second sets of the field-replaceable storage units and that differs from the digital media content set;
   updating the content stored on each of the plurality of media players by physically replacing the installed set of field-replaceable storage units on each media player with one of the second sets of field-replaceable storage units; and wherein each of the field-replaceable storage units are physically similar to one another.

16. The method of claim 15, wherein each of the media players comprises a set of receptacles, each of which is configured to receive a field-replaceable storage unit.

17. The method of claim 16, further comprising a step of restricting access to the set of receptacles.

18. The method of claim 15, further comprising installing the plurality of media players that each includes one of the second sets of field-replaceable storage units into a plurality of docking stations disposed within the vehicle.

19. The method of claim 15, wherein each of the second sets comprises one or more field-replaceable units.

* * * * *